United States Patent
Sindhushayana et al.

(10) Patent No.: US 9,991,986 B2
(45) Date of Patent: Jun. 5, 2018

(54) ENHANCED CHANNEL INTERLEAVING FOR OPTIMIZED DATA THROUGHPUT

(71) Applicant: QUALCOMM Incorporated, San Diego, CA (US)

(72) Inventors: Nagabhushana Sindhushayana, San Diego, CA (US); Peter Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 15/178,353

(22) Filed: Jun. 9, 2016

(65) Prior Publication Data

US 2016/0294506 A1    Oct. 6, 2016

Related U.S. Application Data

(63) Continuation of application No. 14/272,852, filed on May 8, 2014, now Pat. No. 9,419,751, which is a continuation of application No. 13/013,710, filed on Jan. 25, 2011, now Pat. No. 8,873,534, which is a continuation of application No. 11/332,722, filed on Jan. 12, 2006, now Pat. No. 7,953,062, which is a continuation of application No. 09/863,196, filed on May 22, 2001, now Pat. No. 6,987,778.

(51) Int. Cl.
*H04J 3/00* (2006.01)
*H04L 1/00* (2006.01)
*H04L 5/00* (2006.01)
*H04L 1/18* (2006.01)

(52) U.S. Cl.
CPC .......... *H04L 1/0002* (2013.01); *H04L 1/0003* (2013.01); *H04L 1/005* (2013.01); *H04L 1/0007* (2013.01); *H04L 1/0009* (2013.01); *H04L 1/0059* (2013.01); *H04L 1/0066* (2013.01); *H04L 1/0069* (2013.01); *H04L 1/0071* (2013.01); *H04L 1/0083* (2013.01); *H04L 5/0048* (2013.01); *H04L 1/0025* (2013.01); *H04L 1/18* (2013.01)

(58) Field of Classification Search
None
See application file for complete search history.

(56) References Cited

U.S. PATENT DOCUMENTS

| | | |
|---|---|---|
| 4,901,307 A | 2/1990 | Gilhousen et al. |
| 5,103,459 A | 4/1992 | Gilhousen et al. |
| 5,983,383 A | 11/1999 | Wolf |

(Continued)

OTHER PUBLICATIONS

3G TS 25.211 "Physical channels and mapping of transport channels onto physical channels (FDD)", Release 5, V5.0.0, Mar. 2002.

(Continued)

*Primary Examiner* — Kenny S Lin
(74) *Attorney, Agent, or Firm* — Holland & Hart LLP

(57) ABSTRACT

In a transmission scheme wherein multi-slot packet transmissions to a remote station can be terminated by an acknowledgment signal from the remote station, code symbols can be efficiently packed over the multi-slot packet so that the remote station can easily decode the data payload of the multi-slot packet by decoding only a portion of the multi-slot packet. Hence, the remote station can signal for the early termination of the multi-slot packet transmission, which thereby increases the data throughput of the system.

20 Claims, 6 Drawing Sheets

(56) References Cited

U.S. PATENT DOCUMENTS

| | | | |
|---|---|---|---|
| 6,094,427 | A | 7/2000 | Yi |
| 6,166,667 | A | 12/2000 | Park |
| 6,370,669 | B1 | 4/2002 | Eroz et al. |
| 6,389,034 | B1 | 5/2002 | Guo et al. |
| 6,430,722 | B1 | 8/2002 | Eroz et al. |
| 6,512,751 | B1 | 1/2003 | Struhsaker et al. |
| 6,567,390 | B1 | 5/2003 | Banister et al. |
| 6,662,331 | B1 | 12/2003 | Kang |
| 6,744,744 | B1 | 6/2004 | Tong et al. |
| 6,771,615 | B1 | 8/2004 | Park et al. |
| 6,771,705 | B2 | 8/2004 | Kenney et al. |
| 6,804,223 | B2 | 10/2004 | Hoffmann et al. |
| 6,965,652 | B1 | 11/2005 | Burd et al. |
| 6,987,778 | B2 | 1/2006 | Sindhushayana et al. |
| 7,068,683 | B1 | 6/2006 | Lundby et al. |
| 7,953,062 | B2 | 5/2011 | Sindhushayana et al. |
| 8,873,534 | B2 | 10/2014 | Sindhushayana et al. |
| 2002/0035709 | A1 | 3/2002 | Chen et al. |
| 2002/0124221 | A1 | 9/2002 | Goldman |
| 2002/0126763 | A1 | 9/2002 | Jeong et al. |
| 2002/0131376 | A1 | 9/2002 | Wheatley et al. |
| 2002/0141433 | A1 | 10/2002 | Kwon et al. |
| 2002/0162074 | A1 | 10/2002 | Bickerstaff |
| 2003/0053435 | A1 | 3/2003 | Sindhushayana et al. |
| 2005/0123427 | A1 | 6/2005 | Kim et al. |
| 2012/0026939 | A1 | 2/2012 | Sindhushayana et al. |
| 2014/0241249 | A1 | 8/2014 | Sindhushayana et al. |

OTHER PUBLICATIONS

3G TS 25.212 "Multiplexing and channel coding (FDD)", Release 5, V5.0.0, Mar. 2002.

3G TS 25.213 "Spreading and modulation (FDD)", Release 5, V5.0.0, Mar. 2002.

3G TS 25.214 "Physical layer procedures (FDD)", Release 5, V5.0.0, Mar. 2002.

EIA/TIA/IS-2002-2-APhysical Layer Standard for cdma2000 Spread Spectrum Systems, 3GPP2 Document C.P0002-A, TIA PN-4694 to be published as TIA/EIA/IS-2000-2-A, Draft Version, Edit Version 30, Nov. 19, 1999.

TIA/EIA/IS-707-A-1: "Data Services Options for Spread Spectrum Systems—Radio Link Protocol Type 3—Addendum No. 1," pp. 1-146 (Dec. 1999).

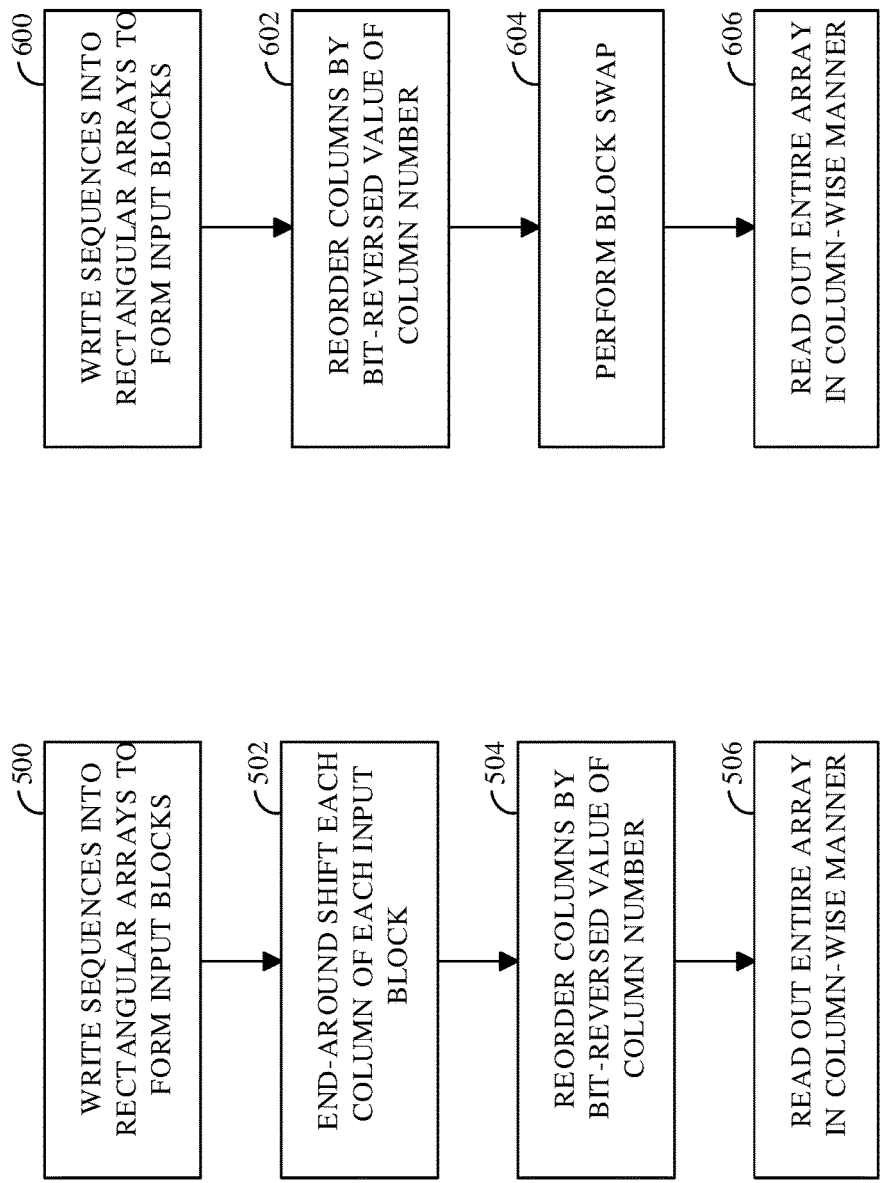

FIG. 7A: BLOCK SWAP PATTERN FOR 8-PSK

FIG. 7B: BLOCK SWAP PATTERN FOR 16-QAM

ENHANCED CHANNEL INTERLEAVING FOR OPTIMIZED DATA THROUGHPUT

CLAIM OF PRIORITY UNDER 35 U.S.C. § 120

This application is a continuation of, and claims priority to, U.S. Ser. No. 14/272,852 filed May 8, 2014, entitled "Enhanced Channel Interleaving For Optimized Data Throughput," which is a continuation of and claims priority to U.S. Ser. No. 13/013,710 filed Jan. 25, 2011, now granted as U.S. Pat. No. 8,873,534 on Oct. 28, 2014, entitled "Enhanced Channel Interleaving For Optimized Data Throughput," which is a continuation of and claims priority to U.S. Ser. No. 11/332,722 filed Jan. 12, 2006, now granted as U.S. Pat. No. 7,953,062 on May 31, 2011, entitled "Enhanced Channel Interleaving For Optimized Data Throughput," which is a continuation of and claims priority to U.S. Ser. No. 09/863,196 filed May 22, 2001, now granted as U.S. Pat. No. 6,987,778 on Jan. 17, 2006, and entitled "Enhanced Channel Interleaving for Optimized Data Throughput," each of which is assigned to the assignee hereof and hereby expressly incorporated by reference herein.

BACKGROUND

Field of the Invention

The present invention relates to data communication. More particularly, the present invention relates to optimizing the data throughput of a wireless communication system.

Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. (As used herein, the term "cellular" systems encompass both cellular and personal communications services (PCS) frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008 (often referred to collectively herein as IS-95), and proposed high-data-rate systems for data, etc. are promulgated by the Telecommunication Industry Association (TIA), the International Telecommunications Union (ITU), and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and fully incorporated herein by reference. An exemplary described system utilizing CDMA techniques is the cdma2000 ITU-R Radio Transmission Technology (RTT) Candidate Submission (referred to herein as cdma2000), issued by the TIA. The standard for cdma2000 is given in draft versions of IS-2000 and has been approved by the TIA. The cdma2000 proposal is compatible with IS-95 systems in many ways. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214. Another CDMA standard is Interim Standard IS-856, which is commonly referred to as a High Data Rate (HDR) system.

Transmission of digital data is inherently prone to interference, which may introduce errors into the transmitted data. Error detection schemes have been suggested to determine as reliably as possible whether errors have been introduced into the transmitted data. For example, it is common to transmit data in packets and add to each packet a cyclic redundancy check (CRC) field, for example of a length of sixteen bits, which carries a checksum of the data of the packet. When a receiver receives the data, the receiver calculates the same checksum on the received data and verifies whether the result of the calculation is identical to the checksum in the CRC field.

When the transmitted data is not used in a delay sensitive application, it is possible to request retransmission of erroneous data when errors are detected. However, when the transmission is used in a delay sensitive application, such as, e.g., in telephone lines, cellular phones, remote video systems, etc., it is not possible to request retransmission.

Convolutional codes have been introduced to allow receivers of digital data to correctly determine the transmitted data even when errors may have occurred during transmission. The convolutional codes introduce redundancy into the transmitted data and pack the transmitted data into packets in which the value of each bit is dependent on earlier bits in the sequence. Thus, when errors occur, the receiver can still deduce the original data by tracing back possible sequences in the received data.

To further improve the performance of a transmission channel, interleavers are used to re-order bits in the packet during coding. Thus, when interference destroys some adjacent bits during transmission, the effect of the interference is spread out over the entire original packet and can more readily be overcome by the decoding process. Other improvements may include multiple-component codes that encode the packet more than once, in parallel or in series, or a combination thereof. For example, it is known in the art to employ an error correction method that uses at least two convolutional coders in parallel. Such parallel encoding is commonly referred to as turbo coding.

For multiple-component codes, optimal decoding is often a very complex task, and may require large periods of time not usually available for on-line decoding. Iterative decoding techniques have been developed to overcome this problem. Rather than determining immediately whether received bits are zero or one, the receiver assigns each bit a value on a multilevel scale representative of the probability that the bit is one. Data represented on the multilevel scale is referred to as "soft data," and iterative decoding is usually soft-in/soft-out, i.e., the decoding process receives a sequence of inputs corresponding to probabilities for the bit values and provides as output corrected probabilities, taking into account constraints of the code. Generally, a decoder that performs iterative decoding uses soft data from former iterations to decode the soft data read by the receiver. During iterative decoding of multiple-component codes, the decoder uses results from the decoding of one code to improve the decoding of the second code. When parallel encoders are used, as in turbo coding, two corresponding decoders may conveniently be used in parallel for this purpose. Such iterative decoding is carried out for a plurality of iterations until it is believed that the soft data closely represents the transmitted data. Those bits that have a probability indicating that they are closer to one are assigned binary zero, and the remaining bits are assigned binary one.

Turbo coding represents an important advancement in the area of forward error correction (FEC). There are many variants of turbo coding, but most types of turbo coding use multiple encoding steps separated by interleaving steps combined with the use of iterative decoding. This combination provides previously unavailable performance with respect to noise tolerance in a communications system. Namely, turbo coding allows communications at levels of energy-per-bit per noise power spectral density ($E_b/N_0$) that were previously unacceptable using the existing forward error correction techniques.

Many communication systems use forward error correction techniques and therefore would benefit from the use of turbo coding. For example, turbo codes could improve the performance of wireless satellite links, in which the limited downlink transmit power of the satellite necessitates receiver systems that can operate at low $E_b/N_0$ levels.

Digital wireless telecommunication systems also use forward error correction. For example, the Telecommunications Industry Association has promulgated the over-the-air interface standard TIA/EIA Interim Standard 95, and its derivatives, such as, e.g., IS-95B (hereinafter referred to collectively as IS-95), which define a digital wireless communications system that uses convolutional encoding to provide coding gain to increase the capacity of the system. A system and method for processing radio-frequency (RF) signals substantially in accordance with the use of the IS-95 standard is described in U.S. Pat. No. 5,103,459, which is assigned to the assignee of the present invention and fully incorporated herein by reference.

It is an object of the embodiments described herein to provide enhanced data throughput in systems utilizing turbo encoding.

SUMMARY

A novel and improved method and apparatus for enhancing data throughput of a wireless communication system are presented herein. In one aspect, an apparatus for increasing data throughput of a wireless communication system is presented. The apparatus comprises a scheduler unit configured to schedule a multi-slot packet transmission to a remote station in accordance with a scheduling algorithm, wherein the scheduling algorithm uses a data request message from the remote station to determine an initial set of transmission parameters and uses an acknowledgment signal from the remote station to determine a subsequent set of transmission parameters; and a channel interleaver configured to perform a permutation of a plurality of data symbols separately from a permutation of a plurality of parity symbols, wherein the scheduler unit schedules the plurality of permuted data symbols for transmission at the beginning of the multi-slot packet transmission and schedules the plurality of permuted parity symbols at the end of the multi-slot packet transmission.

In another aspect, the apparatus further comprises a symbol generation element for puncturing the output of the channel interleaver in accordance with predetermined puncture patterns. Puncturing the output has the effect of truncating or shortening the output of the channel interleaver.

In another aspect, a method for interleaving data and parity symbols for transmission from a base station to a remote station in a wireless communication system is presented. The method comprises the steps of: permuting a plurality of data symbols to form a first permutation block; permuting a plurality of parity symbols to form a second permutation block; generating an output sequence by sequentially reading elements of the first permutation block and the second permutation block; and scheduling a multi-slot packet transmission from the base station to the remote station, wherein the scheduling packs data symbols of the output sequence at the beginning of the multi-slot packet and parity symbols of the output sequence at the end of the multi-slot packet.

BRIEF DESCRIPTION OF THE DRAWINGS

FIG. 5 is a flow chart of another embodiment that reorders the output of a turbo encoder.

FIG. 6 is a flow chart of another embodiment that reorders the output of a turbo encoder.

FIG. 7A defines a one-to-one swap between bit groups for the 8-PSK modulation scheme.

FIG. 7B defines a one-to-one swap between bit groups for the 16-QAM modulation scheme.

DETAILED DESCRIPTION

Figure 1:
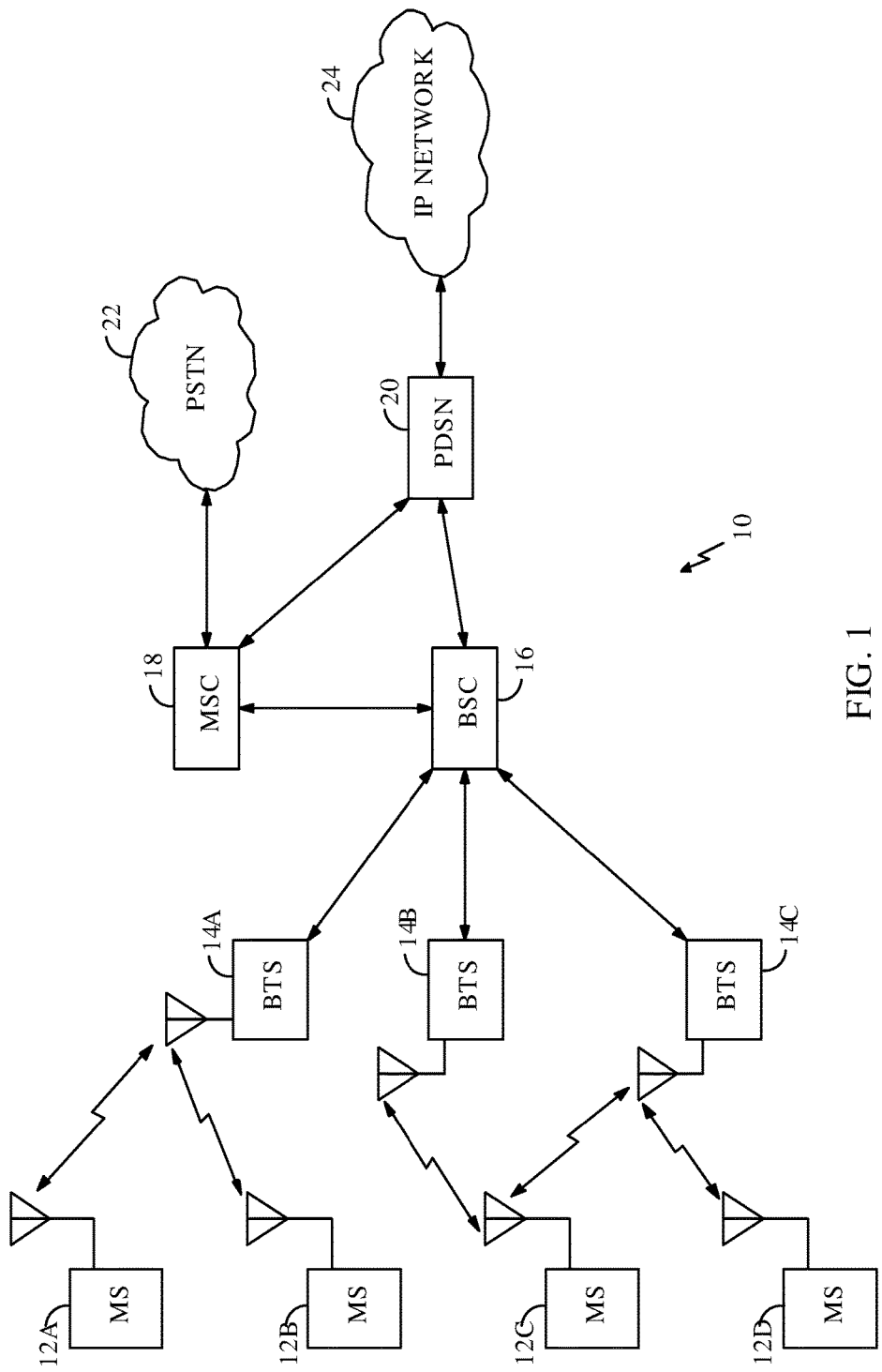
FIG. 1 is a block diagram of an exemplary voice and data communication system.

As illustrated in FIG. 1, a wireless communication network 10 generally includes a plurality of mobile stations (also called subscriber units or user equipment) 12A-12D, a plurality of base stations (also called base station transceivers (BTSs) or Node B) 14A-14C, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12A-12D, three base stations 14A-14C, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12A-12D may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12A-12D may be configured to perform one or more wireless packet data protocols such as described in, for example, the EIA/TIA/IS-707 standard. In a particular embodiment, the mobile stations 12A-12D generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC 18 is coupled to the BSC 16 and the PSTN 22, and the BSC 16 is coupled to the base stations 14A-14C via wirelines configured for transmission of voice and/or data packets in accordance with any of several known protocols including, e.g., E1, T1, Asynchronous Transfer Mode (ATM), IP, Frame Relay, HDSL, ADSL, or xDSL. In an alternate embodiment, the BSC 16 is coupled directly to the PDSN 20, and the MSC 18 is not coupled to the PDSN 20. In another embodiment of the invention, the mobile stations 12A-12D communicate with the base stations 14A-14C over an RF interface defined in the $3^{rd}$ Generation Partnership Project 2 "3GPP2," "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999), which is fully incorporated herein by reference.

During typical operation of the wireless communication network 10, the base stations 14A-14C receive and demodulate sets of reverse-link signals from various mobile stations 12A-12D engaged in telephone calls, Web browsing, or other data communications. Each reverse-link signal received by a given base station 14A-14C is processed within that base station 14A-14C. Each base station 14A-14C may communicate with a plurality of mobile stations 12A-12D by modulating and transmitting sets of forward-link signals to the mobile stations 12A-12D. For example, as shown in FIG. 1, the base station 14a communicates with first and second mobile stations 12A, 12B simultaneously, and the base station 14C communicates with third and fourth mobile stations 12C, 12D simultaneously. The resulting packets are forwarded to the BSC 16, which provides call resource allocation and mobility management functionality including the orchestration of soft handoffs of a call for a particular mobile station 12A-12D from one base station 14A-14C to another base station 14A-14C. For example, a mobile station 12C is communicating with two base stations 14B, 14C simultaneously. Eventually, when the mobile station 12C moves far enough away from one of the base stations 14C, the call will be handed off to the other base station 14B.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some exemplary CDMA systems, packets carrying data traffic are divided into subpackets, which occupy "slots" of a transmission channel. For illustrative ease only, the nomenclature of a High Data Rate (HDR) system is used herein. Such use is not intended to limit the implementation of the invention to HDR systems. Embodiments can be implemented in other CDMA systems, such as, e.g. cdma2000, without affecting the scope of the embodiments described herein.

In an HDR system, slot sizes have been designated as 1.66 ms, but it should be understood that slot sizes might vary in the embodiments described herein without affecting the scope of the embodiments. For example, the slot size in cdma2000 systems is 1.25 ms in duration. In addition, data traffic can be transmitted in message frames, which can be 5 ms, 10 ms, 20 ms, 40 ms or 80 ms in duration in IS-95 systems. The terms "slots" and "frames" are terms used with respect to different data channels within the same or between different CDMA systems. A CDMA system comprises a multitude of channels on the forward and reverse links, wherein some channels are structured differently from others. Hence, the terminology to describe some channels will differ in accordance with channel structure. For illustrative purposes only, the term "slots" will be used hereafter to describe the packaging of signals propagated over the air.

Redundant representations of the data payload are packed into frames, or subpackets, which can then be soft-combined at the receiver. Redundancy refers to the substantially similar information carried by each subpacket. Redundant representations may be generated either through repetition or through additional coding. The process of soft-combining allows the recovery of corrupted bits. Through the process of soft combining, wherein one corrupted subpacket is combined with another corrupted subpacket, the transmission of repetitious and redundant subpackets can allow a system to transmit data at a minimum transmission rate. The transmission of repetitious and redundant subpackets is especially desirable in the presence of fading. Rayleigh fading, which is a form of multipath interference, occurs when multiple copies of the same signal arrive at the receiver at different phases, potentially causing destructive interference. Substantial multipath interference with very small delay spread can occur to produce flat fading over the entire signal bandwidth. If the remote station is traveling in a rapidly changing environment, deep fades could occur at times when subpackets are scheduled for retransmission. When such a circumstance occurs, the base station requires additional transmission power to transmit the subpacket.

For example, if a scheduler unit within a base station receives a data packet for transmission to a remote station, the data payload is redundantly packed into a plurality of subpackets, which are sequentially transmitted to a remote station. When transmitting the subpackets, the scheduler unit may decide to transmit the subpackets either periodically or in a channel sensitive manner.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time-multiplexed manner. Alternatively, packet data channels are also described as shared supplemental channels. For the purposes of describing the embodiments herein, the supplemental channels and the packet data channels are generically referred to as data traffic channels.

Supplemental channels and packet data channels can improve the average transmission rate of the system by allowing the transmission of unexpected data messages to a target station. Since the data payload can be redundantly packed on these channels, a multi-slot transmission scheduled on the forward link can be terminated early if the remote station can determine that the data payload is recoverable from the subpackets that have already been received. As described above, the data payload that is carried in each slot has undergone various encoding steps wherein the encoded bits are re-ordered into a channel-tolerant format. Hence, in order to accomplish data recovery, the decoder of the remote station must operate on the entire contents of each slot of the multi-slot transmission. However, operation of the decoder after each slot is a power-intensive process that can inordinately drain the battery power of the remote station.

The embodiments described herein will reduce the power drain due to the operation of the decoder by allowing the decoder to operate on partial transmissions of data packets. In addition to reducing the power drain, the embodiments allow a minimum transmission rate to be maintained.

Determining Data Transmission Rates on the Forward Link

In an HDR system, the rates at which the subpackets are to be transmitted from a base station to a remote station are determined by a rate control algorithm performed by the remote station and a scheduling algorithm at the base station. This method to modify the data transmission rate is referred to as an Automatic Repeat Request (ARQ) procedure. It should be noted that the system throughput is determined by the rate at which data payload is actually received, which differs from the bit rate of the transmitted subpackets.

The rate control algorithm is implemented by the remote station in order to determine which base station in the active set can provide the best throughput and to determine the maximum data rate at which the remote station can receive packets with sufficient reliability. The active set is the set of base stations that are currently in communication with the remote station. In a typical CDMA or non-CDMA wireless system, a base station transmits a known signal, referred to as a "pilot," at well-defined, periodic intervals. The remote station typically monitors the pilot signal of each base station maintained in the active set, and determines the signal-to-noise-and-interference ratio (SINR) of each pilot signal. Based on past SINR information, the remote station predicts a future value of the SINR for each base station, wherein the future value of the SINR will be associated with the next packet duration. The remote station then picks the base station that is likely to have the most favorable SINR over a period of the near future, and estimates the best data rate at which the remote station can receive the next data packet from this base station. The remote station then transmits a data rate control message (DRC) carrying this data rate information to the base station. It is understood that the best data rate information carried by the DRC is the data rate at which the remote station requests the next data packet to be transmitted. In an HDR system, the DRC messages are transmitted on a MAC channel of the reverse link waveform.

The scheduling algorithm is implemented at the base station to determine which remote station will be the recipient of the next packet. The scheduling algorithm takes into account the need to maximize base station throughput, the need to maintain fairness between all remote stations operating within the range of the base station, and the need to accommodate the data transmission rates requested by various remote stations. As discussed below, the fast ARQ procedure determines the actual data transmission rate at which each data packet is received, as opposed to the data transmission rate initially determined by the rate control algorithm.

A scheduling unit in the base station monitors the arrival of DRCs from all remote stations that are operating within its range, and uses the DRC information in the scheduling algorithm to determine which remote station will be the next data packet recipient, in accordance with an optimal forward link throughput level. It should be noted that an optimal forward link throughput takes into consideration the maintenance of acceptable link performances for all remote stations operating within the range of the base station. The scheduling unit reassembles the data packet into subpackets with the appropriate bit rate, and generates a transmission schedule for the subpackets on designated slots.

In an HDR system, the forward link data rates vary from 38.4 kbps to 2.456 Mbps. The duration of each packet transmission in number of slots as well as other modulation parameters are described in Table 1.

TABLE 1

Forward Link Modulation Parameters

| Data Rate (kbps) | Number of Slots | Bits per Packet | Code Rate | Modulation |
|---|---|---|---|---|
| 38.4 | 16 | 1024 | 1/5 | QPSK |
| 76.8 | 8 | 1024 | 1/5 | QPSK |
| 153.6 | 4 | 1024 | 1/5 | QPSK |
| 307.2 | 2 | 1024 | 1/5 | QPSK |
| 614.4 | 1 | 1024 | 1/3 | QPSK |
| 307.2 | 4 | 2048 | 1/3 | QPSK |
| 614.4 | 2 | 2048 | 1/3 | QPSK |
| 1228.8 | 1 | 2048 | 2/3 | QPSK |
| 921.6 | 2 | 3072 | 1/3 | 8-PSK |
| 1843.2 | 1 | 3072 | 2/3 | 8-PSK |
| 1228.8 | 2 | 4096 | 1/3 | 16-QAM |
| 2457.6 | 1 | 4096 | 2/3 | 16-QAM |

In an HDR system, code symbols that are transmitted in subpackets at lower data rates are code-extensions or repetitions of the code symbols that are transmitted at certain higher rates. In many cases, the code symbols transmitted in a given subpacket are shifted repetitions of the code symbols transmitted in the earlier slots of the packet. The lower data rates require a lower SINR for a given low probability of packet error. Hence, if the remote station determines that channel conditions are not favorable, the remote station will transmit a DRC message requesting a low data rate packet, which comprises multiple subpackets. The base station will then transmit multi-slot packets in accordance with parameters stored in the scheduling unit, an example of which is presented in Table 1.

As the subpackets are transmitted, the remote station may determine that the data packet can be decoded from only a portion of the subpackets scheduled for transmission. Using the fast ARQ procedure, the remote station instructs the base station to stop the transmission of the remaining subpackets, thereby increasing the effective data transmission rate of the system. However, in order to cause the early termination of the scheduled subpacket transmissions, the remote station may have to run the decoder over every slot carrying a subpacket, which requires the consumption of a large amount of power.

It should be noted that the ARQ procedure has the potential to significantly increase the forward link throughput of the underlying wireless communication system. As discussed above, when the remote station transmits a DRC message to the base station, the requested data transmission rate is determined using the rate control algorithm, which uses past SINR values to predict the SINR value of the near future. However, due to fading conditions that arises due to environmental factors and the mobility of the remote station, the prediction of the SINR for the near future is not reliable. In addition, the SINR of the forward link traffic signal may be very different from the SINR of the pilot signal due to interference from adjacent base stations. It is possible that some of the neighboring base stations may have been idle during the sampling period for the SINR prediction calculations. As a result, the remote station may not always predict the SINR with great accuracy. Therefore, the rate control algorithm provides a lower bound estimate for the actual SINR during the next packet duration with high probability, and determines the maximum data transmission rate that can be sustained if the actual SINR is equal to this lower bound estimate. In other words, the rate control algorithm provides a conservative measure of the data transmission rate at which the next packet can be received. The ARQ procedure refines this estimate, based on the quality of the data received during the initial stages of the packet transmission. Hence, it is important for the remote station to inform the base station as soon as the remote station has enough information to decode a data packet, so that early termination of transmissions can occur, which enhances the data transmission rate of the data packet.

Transmissions of the subpackets to the remote station are sent in a staggered pattern so that transmission gaps occur between the subpackets. In one embodiment, the subpackets are transmitted periodically at every $4^{th}$ slot. The delay between subpackets provides an opportunity for the target remote station to decode the subpacket before the arrival of the next subpacket. If the remote station is able to decode the subpacket before the arrival of the next subpacket and to verify the Cyclic Redundancy Check (CRC) bits of the decoded result before the arrival of the next subpacket, the remote station can transmit an acknowledgment signal, hereinafter referred to as a FAST_ACK (acknowledgement) signal, to the base station. If the base station can demodulate and interpret the FAST_ACK signal sufficiently in advance of the next scheduled subpacket transmission, the base station need not send the remaining scheduled subpacket transmissions. The base station may then transmit a new data packet to the same remote station or to another remote station during the slot period that had been designated for the cancelled subpackets. It should be noted that the FAST_ACK signal herein described is separate and distinct from the ACK messages that are exchanged between the higher layer protocols, such as the Radio Link Protocol (RLP) and the Transmission Control Protocol (TCP).

Since the ARQ procedure allows a fast rate adaptation to channel conditions, the ARQ procedure allows for the implementation of a system wherein the initial data transmission can be performed at a high data rate and ramped down as needed. In contrast, a system without ARQ would be forced to operate at a lower data rate, in order to provide a sufficient link budget margin to account for channel variations during packet transmissions.

Reducing Power Consumption by Reducing Decoder Operation

In one embodiment, the remote station can reduce the power consumption of the decoder by operating the decoder in accordance with statistical properties of the channel. The remote station determines the average SINR of the pilot signal corresponding to the arrival times of received subpackets. It should be noted that the average traffic channel SINR may be higher than the average SINR of the pilot channel, due to the inactivity of neighboring base stations during the packet transmission, and that the average pilot channel SINR is subject to measurement noise, which also introduces uncertainty in the average traffic channel SINR. The remote station compares the average SINR to an entry in a lookup table. For each data rate, the lookup table associates a number of subpackets (i.e., transmission slots) to a required packet SINR level, the required packet SINR level being a threshold value for which packet information can be obtained at a low error rate from a minimum number of subpackets. The entries in this lookup table may be base on simulation or controlled testing of the remote station demodulator performance under various channel conditions.

If the average SINR is considerably lower than the corresponding required packet SINR level in the look-up table, then the remote station refrains from decoding the received subpackets and waits for the next subpacket arrival. The remote station continues the process of making average SINR calculations of the pilot signals.

If the average SINR is lower than the corresponding required packet SINR level in the look-up table, but remains within a tolerance value, and if the actual SINR over the data period is significantly higher than the average pilot channel SINR, then the remote station may decode the received subpackets. The remote station operates the decoder for a small number of iterations. If the decoding is successful, then the remote station transmits a FAST_ACK signal to the base station.

If the average SINR is larger than the required packet SINR level in the look-up table by a second tolerance value, then the remote station operates the decoder for a small number of iterations. It should be observed that if the traffic channel has a favorable SINR level, then the transmitted subpackets could likely be decoded with a small number of iterations.

If the average SINR is in the close vicinity of the required packet SINR level in the look-up table, then the remote station operates the decoder for a large number of iterations. In an embodiment described below, a dynamic stopping criterion is presented to limit the number of iterations of the decoder.

In the embodiment described above, positive, real-valued parameters $\Delta_1 \geq \Delta_2 \geq 0$, and $\Delta_3 \geq 0$ can be set, and non-negative integer-valued parameters $0 \leq N_1 \leq N_2 \geq N$, $\geq 0$ can be set. Let S denote the average SINR measured over the first few received subpackets, and let T denote the required packet SINR threshold from the look-up table, for the given (initial) data rate, over the given number of subpackets. If $S<T-\Delta_1$, then the mobile does not attempt to decode the packet with currently available data. If $T-\Delta_1 \leq S < T-\Delta_2$, then the mobile attempts to decode the packet with a maximum of $N_1$ iterations. If $T-\Delta_2 \leq S < T+\Delta_3$, then the mobile attempts to decode the packet with a maximum of $N_2$ iterations. If $S \geq T+\Delta_3$, then the mobile attempts to decode the packet with a maximum of $N_3$ iterations. In all cases, a dynamic stopping rule is implemented, which prevents the decoder from running too many iterations after the packet has been successfully decoded.

Turbo decoding is an iterative procedure, wherein a symbol is decoded after a specified number of iterations. A dynamic stopping rule can be designed to avoid running iterations after the symbol is successfully decoded, while retaining the ability to use a large number of decoding iterations only for badly degraded code symbols.

In one embodiment, a dynamic stopping rule is implemented to produce significant power savings while maintaining a high data transmission rate. A minimum number of iterations $N_{min}$ and a maximum number of iterations $N_{max}$ are set at the remote station. $N_{min}$ iterations are run. The CRC bits of the decoded payload are determined and compared to the CRC bits of the decoded packet. If the two sets of CRC bits are equal, then the CRC bits are deemed valid and the decoder is run for a successive iteration to determine if a subsequent payload has valid CRC bits. If the two sets of CRC bits are not equal, then the CRC bits are deemed invalid and another iteration is run. If the CRC bits from two successive iterations are both deemed valid, then the decoding is deemed successful and terminated. If the number of iterations reaches $N_{max}$, the decoding is terminated.

Transmitting Interleaved Symbols that Minimize Decoder Operations

In another embodiment to reduce decoder operations, which can be used in conjunction with the dynamic stopping rule and the channel sensitive method described above or can be implemented independently from the dynamic stopping rule and channel sensitive method described above, the subpackets can be transmitted in a manner that allows the decoder to determine the payload of the partial slot transmissions quickly, while still providing protection from burst errors.

A channel interleaver can be configured in accordance with this embodiment to permute the bits of an encoded symbol and provide incremental redundancy. In this embodiment, a permutation of the bits is designed so that the systematic bits are sent during a partial transmission of the multi-slot packet. The decoder may be able to determine the data payload from the arrival of only a portion of the subpackets. If the payload cannot be decoded, then the remote station transmits a negative acknowledgment (NAK) on the ARQ channel. The base station receives the NAK and transmits a subsequent subpacket, containing additional parity bits. If the remote station cannot decode the subpackets with the already received systematic bits and the newly received parity bits, then another NAK is transmitted. The base station receives the second NAK and transmits another subpacket, which includes additional parity bits. As further NAKs are received during the ARQ procedure, subsequent subpackets transmitted by the base station contain more parity bits.

In other words, the channel interleaver permutes the systematic bits and the parity bits in a manner such that the systematic bits are loaded at the front of a packet and the parity bits are loaded at the rear of the packet. For transmission purposes, the packet is divided up into portions, and each portion is transmitted sequentially, as needed by the remote station. Hence, if additional information is needed to decode the data payload, only the additional parity bits are transmitted, rather than retransmitting the entire encoder output.

This process of loading systematic bits at the beginning of the scheduled packet transmission may appear to defeat the purpose of a channel interleaver, but the embodiment described herein can be implemented to provide resilience to burst errors while still allowing the decoder to operate on only a partial transmission of the packet. In most implementations of power-efficient, wireless communication systems using turbo codes, the output of the turbo encoder is scrambled either before or after channel interleaving so that data is randomized prior to modulation. The random scrambling of the turbo encoder output limits the peak-to-average ratio of the envelope of the modulated waveform.

Figure 2:
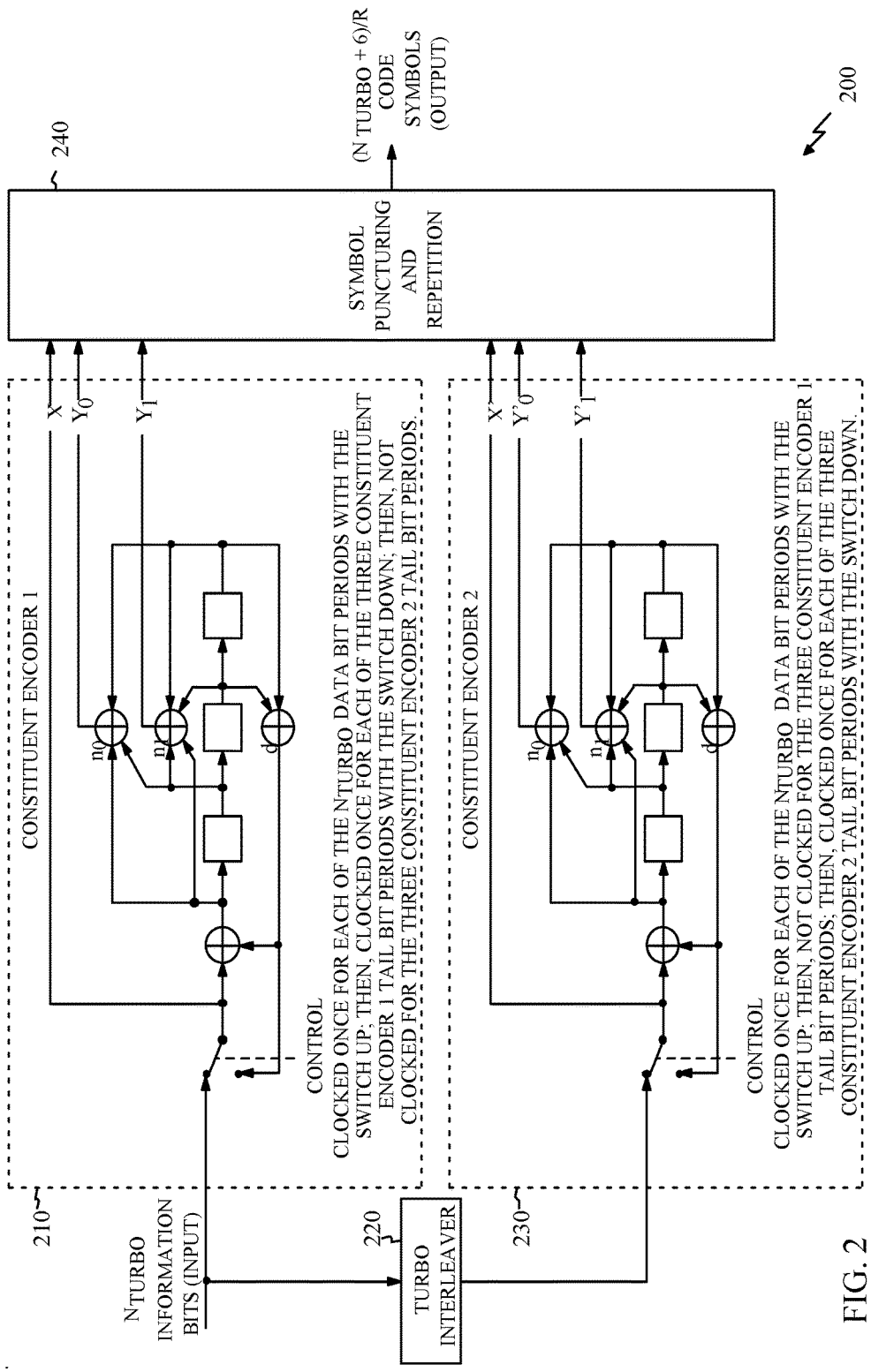
FIG. 2 is a block diagram of a turbo encoder.

FIG. 2 is a block diagram of a turbo encoder that is configured to operate with the channel interleaver embodiments herein described. Turbo encoder 200 comprises a first constituent encoder 210, a turbo interleaver 220, a second constituent encoder 230, and a symbol generation element 240. The first constituent encoder 210 and the second constituent encoder 230 are connected in parallel, with the turbo interleaver 220 preceding the second constituent encoder 230. The output of the first constituent encoder 210 and the output of the second constituent encoder 230 are input into the symbol generation element 240, wherein the outputs are punctured and repeated in order to form the desired number of turbo encoder output symbols.

In one embodiment, the first and second constituent encoders 210, 230 are recursive, convolutional encoders, each configured in accordance with the transfer function:

$G(D)=[1,n_0(D)/d(D),n_1(D)/d(D)]$, wherein $d(D)=1+D^2+D^3$, $n_0(D)=1+D+D^3$, and $n_1(D)=1+D+D^2+D^3$. Using the first and second constituent encoders 210, 230, the turbo encoder 200 generates a plurality of encoded data output symbols and a plurality of encoded tail output symbols, wherein the plurality of encoded data output symbols are subsequently punctured by the symbol generation element 240 and the plurality of encoded tail output symbols are subsequently both punctured and repeated by the symbol generation element 240.

Initially, the states of the first constituent encoder 210 and the second constituent encoder 230 are set to zero. Let $N_{turbo}$ be the number of data bits input into the turbo encoder 200, after a 6-bit Physical Layer packet tail field is discarded. The first constituent encoder 210 is clocked once for each of the $N_{turbo}$ bits with the switch 250 in the up position. The second constituent encoder 230 is also clocked once for each of the $N_{turbo}$ bits with the switch 250 in the up position. The resultant encoded data symbols are input sequentially into symbol generation element 240, in the order X, $Y_0$, $Y_1$, X', $Y'_0$, and $Y'_1$, with the X output first. The sequence X, $Y_0$, $Y_1$, X', $Y'_0$, $Y'_1$ is then punctured by the symbol generation element 240, in the manner specified below in Table 2.

TABLE 2

Puncturing Patterns for Encoded Data Symbols.

| Output | Code Rate 1/3 | Code Rate 1/5 |
|---|---|---|
| X | 1 | 1 |
| $Y_0$ | 1 | 1 |
| $Y_1$ | 0 | 1 |
| X' | 0 | 0 |
| $Y'_0$ | 1 | 1 |
| $Y'_1$ | 0 | 1 |

(For each rate, the puncturing table is read from top to bottom.)

In Table 2, "0" indicates that the symbol will be deleted, and "1" indicates that the symbol will be passed. In this embodiment, symbol repetition is not used in generating the encoded data output symbols.

After the packet data bits have been encoded into data symbols, the turbo encoder 200 generates tail output symbols. The tail output symbols are generated by clocking each of the constituent encoders for half of the duration of the total tail bit periods while the other constituent encoder is left unclocked. For example, in the embodiment wherein the rate of the turbo encoder is R, and the number of tail output symbols desired is 6/R, then the first 3/R tail output symbols are generated when the first constituent encoder 210 is clocked three times with the switch 250 in the down position and the second constituent encoder 230 is not clocked. Hence, no output is generated by the constituent encoder 230 during this period. The resultant encoded tail output symbols undergo puncturing and symbol repetition at symbol generation element 240. The last 3/R tail output symbols are generated when the second constituent encoder 230 is clocked three times with the switch 250 in the down position while the first constituent encoder 210 is not clocked. The resultant encoded tail output symbols undergo puncturing and symbol repetition at symbol generation element 240.

The outputs of the first and second constituent encoders 210, 230 are input into symbol generation element 240 in the sequence X, $Y_0$, $Y_1$, X', $Y'_0$, and $Y'_1$, with the X output first. Sequence X, $Y_0$, $Y_1$, X', $Y'_0$, and $Y'_1$ of the encoded tail output symbols are punctured in accordance with Table 3 below. In Table 3, "0" indicates that the symbol will deleted, and "1" indicates that the symbol passes.

TABLE 3

Puncturing Patterns for Tail Bit Periods.

| Output | Code Rate 1/3 | Code Rate 1/5 |
|---|---|---|
| X | 111 000 | 111 000 |
| $Y_0$ | 111 000 | 111 000 |
| $Y_1$ | 000 000 | 111 000 |
| X' | 000 111 | 000 111 |
| $Y'_0$ | 000 111 | 000 111 |
| $Y'_1$ | 000 000 | 000 111 |

(For rate R=1/3 turbo codes, the puncturing table is read first from top to bottom, repeating X and X', and then from left to right. For rate R=1/5 turbo codes, the puncturing table is read first from top to bottom, repeating X, X', $Y_1$ and $Y'_1$, and then from left to right.)

For rate R=1/5, the tail output code symbols for each of the first three tail bit periods can be punctured and repeated to form the sequence $XXY_0Y_1Y_1$. The tail output code symbols for each of the last three tail bit periods are punctured and repeated to form the sequence $X'X'Y'_0Y'_1Y'_1$. For rate R=1/3, the tail output code symbols of the first three tail bit periods are punctured and repeated to form the sequence $XXY_0$. The tail output code symbols of the last three tail bit periods are punctured and repeated to form the sequence $X'X'Y'_0$.

Figure 3:
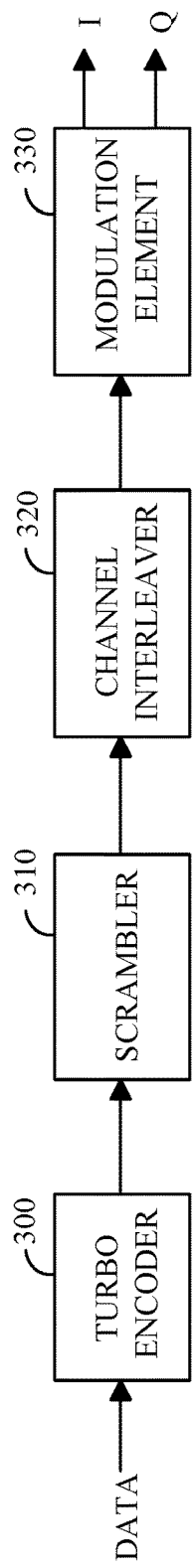
FIG. 3 is a block diagram of an apparatus that uses a turbo encoder to generate forward traffic channels.

FIG. 3 is a block diagram of an apparatus that uses a turbo encoder to generate forward traffic channels. Data packets are input into a turbo encoder 300. Turbo encoder 300 can be configured in the manner described for FIG. 2, but alternative configurations can be implemented without affecting the scope of the embodiments. In one embodiment, a scrambler 310 is used to randomize the output of the turbo encoder 300. Scrambler 310 can be implemented by a linear feedback shift register (LSFR), which is configured in accordance with the generator sequence $h(D)=D^{17}+D^{14}+1$. Every output code symbol of the turbo encoder 300 is XORed with an output bit of the scrambler 310. The scrambler 310 can be initialized by information such as the MAC index value and/or the data rate, and is clocked once for every encoder output symbol. The output of the scrambler 310 is interleaved by a channel interleaving element 320. The interleaving is implemented in accordance with the embodiments described below.

Various implementations of a channel interleaving element 320 can be used to realize the embodiments described below. For example, a channel interleaving element can be produced using at least one memory element and a processor. Alternatively, a lookup table of READ addresses or WRITE addresses may be used permute an array of input symbols to generate an array of interleaved symbols. In another alternative, a state machine can be used to generate a sequence of addresses defining the permutation of input symbols. Other implementations are known to those of skill in the art, and will not be described herein. The choice of implementation will not affect the scope of the embodiments below.

The output of the channel interleaving element 320 is separated into in-phase (I) and quadrature phase (Q) sequences by modulation element 330. Modulation element 330 is configured to perform Quadrature Phase Shift Keying (QPSK), 8-ary Phase Shift Keying (PSK), and 16-ary Quadrature Shift Keying (QSK) modulation upon the interleaved symbols, wherein the choice of modulation scheme is determined based on the data transmission rate of the packet. An example of the choice of the modulation schemes based on data transmission rates is presented in Table 1. The output of the modulation element 330 undergoes further processing, in accordance with the type of CDMA system in which the embodiments are implemented. The additional processing steps will not be described herein since these processing steps are not directly relevant to the understanding of the scope of the embodiments. Descriptions of the specific processing steps can be found in the aforementioned CDMA documents.

Figure 4:
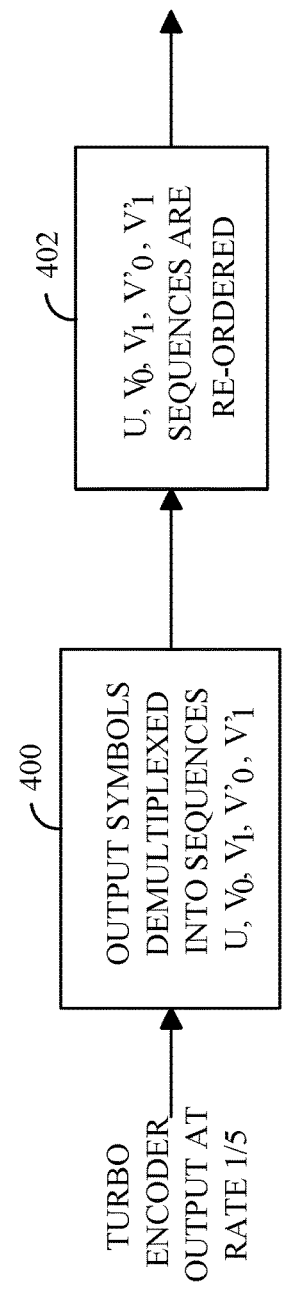
FIG. 4 is a flow chart of an embodiment that reorders the output of a turbo encoder.

In one embodiment, the output of a turbo encoder operating at rate 1/5 can be reordered by the method described in FIG. 4, wherein all the data and tail output symbols are demultiplexed into five sequences, denoted U, $V_0$, $V_1$, $V'_0$ and $V'_1$. At step 400, the output symbols are sequentially distributed from the U sequence to the $V'_1$ sequence, wherein the first output symbol is placed in the U sequence, the second output symbol is placed in the $V_0$ sequence, the third output symbol is placed in the $V_1$ sequence, the fourth output symbol is placed in the $V'_0$ sequence, and the fifth output symbol is placed in the $V'_1$ sequence. The next, subsequent output symbols repeat this pattern. At step 402, the U, $V_0$, $V_1$, $V'_0$ and $V'_1$ sequences are rearranged according to the order U, $V_0$, $V'_0$, $V_1$, and $V'_1$. It should be noted that this order can altered as long as the U sequence remains first, and the $V_1$ and $V'_1$ sequences are placed at the end of the order.

In an embodiment wherein the turbo encoder is operating at rate 1/3, the demultiplexing can be completed using three sequences, denoted U, $V_0$, and $V'_0$. In this case, the rearrangement of the order of $V_0$, and $V'_0$ results in an equivalent interleaver from the viewpoint of error performance, since the requirement that the first and last sequences remain at the first position and last position has not been violated.

In the embodiment wherein the turbo encoder operates at rate=1/5, the channel interleaver will be configured to permute code symbols in three separate bit-reversal interleaver blocks with the first block comprising the sequence of U symbols, the second block comprising the sequence of $V_0$ and $V'_0$ symbols, and the third block comprising the sequence of $V_1$ and $V'_1$ symbols. In the embodiment wherein the turbo encoder operates at rate=1/3, the channel interleaver will be configured to permute code symbols in two separate blocks, with the first block comprising the sequence of U sequences and the second block comprising the sequence of $V_0$ and $V'_0$ symbols. For the sake of illustrative ease, the embodiment for rate R=1/3 will not be described hereinafter because the embodiment for rate R=1/3 operates in the same manner as the embodiment for rate R=1/5, which is described in detail below in FIG. 5.

In the embodiment wherein a scrambling element is used upon the output symbols of the turbo encoder before channel interleaving occurs, the above embodiment can still be implemented upon a block of scrambled U symbols, a block of scrambled $V_0$ and $V'_0$ symbols, and a block of the scrambled $V_1$ and $V'_1$ symbols.

FIG. 5 is a flow chart for a series of permutation steps in accordance with one embodiment. At step 500, sequences U, $V_0$, $V'_0$, $V_1$, and $V'_1$ are written into rectangular arrays of K rows and M columns to form a first input block U, a second block $V_0/V'_0$, and a third input block $V_1/V'_1$. The symbols are written into the blocks by rows, wherein symbols are placed starting from the top row and are placed from left to right. The columns of the blocks are labeled by the index j, where j=0, . . . , M−1 and column 0 is the left-most column.

At step 502, the symbols of each column of input block U are end-around shifted downward by j mod(K), the symbols of each column of input block $V_0/V'_0$ are end-around shifted downward by ⌊j/4⌋ mod (K), and the symbols of each column of input block $V_1/V'_1$ are also end-around shifted downward by ⌊j/4⌋ mod (K). The floor operator ⌊ ⌋ is used to denote the highest integer value less than or equal to the value within the floor operator.

At step 504, the columns are reordered so that column j is moved to column BRO(j), wherein BRO(j) indicates the bit-reversed value of j. For example, for M=512, BRO(6)=192.

At step 506, the entire array of symbols is read out column-wise, starting from the left-most column, and read from top to bottom.

Using this method, the interleaver output sequence for a turbo encoder at rate=1/5 will be the interleaved U symbols followed by the interleaved $V_0/V'_0$ symbols and then the interleaved $V_1/V'_1$ symbols. At rate=1/3, the interleaver output sequence will be the interleaved U symbols followed by the interleaved $V_0/V'_0$ symbols. Various values for parameters K and M are presented in Table 2.

TABLE 2

Channel Interleaver Parameters

| Physical Layer Packet Size | U Block Interleaver Parameters | | $V_0/V'_0$ and $V_1/V'_1$ Block Interleaver Parameters | |
|---|---|---|---|---|
| | K | M | K | M |
| 1,024 | 2 | 512 | 2 | 1,024 |
| 2,048 | 2 | 1,024 | 2 | 2,048 |
| 3,072 | 3 | 1,024 | 3 | 2,048 |
| 4,096 | 4 | 1,024 | 4 | 2,048 |

Higher rate codes may be generated simply by discarding or truncating the last few outputs of the interleaver. This procedure provides results that approximate optimal or near optimal turbo codes operating at rate 4/5, 2/3, 1/2, 1/3, 1/4, and 1/5, with the appropriate puncture patterns, as shown in Table 3.

TABLE 3

Puncture Patterns for the three Rate 2/3 codes

Symbol Order

| | X $Y_0$ $Y_0'$ $Y_1$ $Y_1'$ | X $Y_0$ $Y_0'$ $Y_1$ $Y_1'$ | X $Y_0$ $Y_0'$ $Y_1$ $Y_1'$ | X $Y_0$ $Y_0'$ $Y_1$ $Y_1'$ |
|---|---|---|---|---|
| Rate 4/5 | 1 1 1 0 0 | 1 0 0 0 0 | 1 0 0 0 0 | 1 0 0 0 0 |
| Rate 4/5 (cont'd) | 1 0 0 0 0 | 1 0 0 0 0 | 1 0 0 0 0 | 1 0 0 0 0 |
| Rate 2/3 | 1 1 1 0 0 | 1 0 0 0 0 | 1 0 0 0 0 | 1 0 0 0 0 |
| Rate 1/2 | 1 1 1 0 0 | 1 0 0 0 0 | 1 1 1 0 0 | 1 0 0 0 0 |
| Rate 1/3 | 1 1 1 0 0 | 1 1 1 0 0 | 1 1 1 0 0 | 1 1 1 0 0 |
| Rate 1/5 | 1 1 1 1 1 | 1 1 1 1 1 | 1 1 1 1 1 | 1 1 1 1 1 |

In another embodiment, the channel interleaver can be configured to increase performance for higher order modulation schemes. As shown in Table 1, an HDR system can accommodate variable transmission rates of data by utilizing different modulation schemes. In one embodiment, an interleaving pattern is designed to enhance the performance of 8-ary Phase Shift Keying (PSK) modulation and 16-ary Quadrature Amplitude Modulation (QAM).

FIG. 6 is a flow chart for a series of permutation steps in accordance with one embodiment. At step 600, sequences U, $V_0$, $V'_0$, $V_1$, and $V'_1$ are written into rectangular arrays of K rows and M columns to form a first input block U, a second block $V_0/V'_0$, and a third input block $V_1/V'_1$. The symbols are written into the blocks by rows, wherein symbols are written starting from the top row and are written from left to right. The columns of the blocks are labeled by the index j, where j=0, . . . , M−1 and column 0 is the left-most column.

At step 602, the columns are reordered so that column j is moved to column BRO(j), wherein BRO(j) indicates the bit-reversed value of j. For example, for M=512, BRO(6)=192.

At step 604, a block swap takes place in accordance with the type of modulation scheme that is to follow the channel interleaver. In an embodiment wherein the 8-PSK modulation scheme will be used in an HDR system, FIGS. 7A and 7B are tables that show the placement of certain groups of bits that can be exchanged with other bits, wherein the one-to-one swap is identified by a number and an accent mark. For example, bits in Group 1 will be exchanged with bits in Group 1'. FIG. 7A is an optimal swapping pattern for an 8-PSK modulation scheme and FIG. 7B is an optimal swapping pattern for a 16-QAM modulation scheme. The optimality of the swapping patterns herein disclosed is determined through empirical observation.

At step 606, the entire array of symbols is read out by columns, starting from the left-most column, and read from top to bottom.

The results from this embodiment optimize the placement of turbo encoder output into the modulation symbols in the multi-slot packet transmission. This embodiment exploits properties of the 8-PSK and the 16-QAM modulation schemes, namely, various bits of the modulation symbols have different levels of protection and the various bits are distributed uniformly in the modulation pattern.

Figure 8:
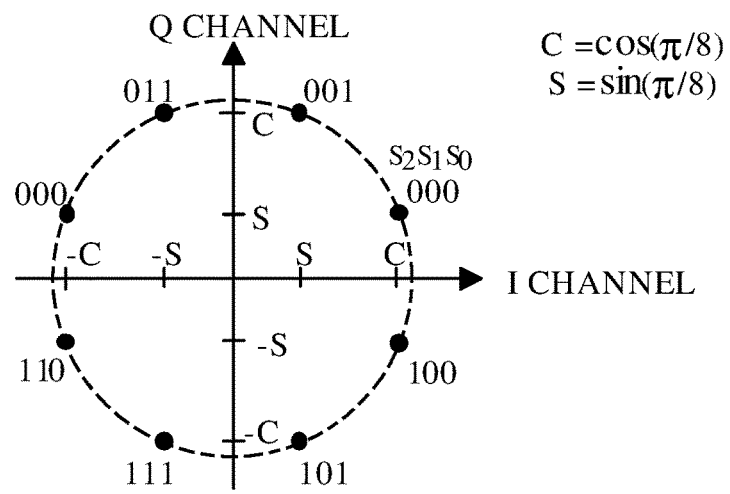
FIG. 8 is a diagram of a signal constellation for the 8-PSK modulation scheme.

In one embodiment, an 8-PSK modulation scheme is used to modulate the signal. FIG. 8 illustrates a signal constellation for the 8-PSK modulation. Three successive channel interleaver output symbols, x(3i), x(3i+1), and x(3i+2), i=0, . . . , M−1, are mapped to the signal constellation point $(m_I(i), m_Q(i))$. Table 4 specifies the mapping of the interleaved symbols to the modulation symbols.

TABLE 4

8—PSK Modulation

| Interleaved Symbols | | | Modulation Symbols | |
|---|---|---|---|---|
| $s_2$ | $s_1$ | $s_0$ | | |
| x(3 k + 2) | x(3 k + 1) | x(3 k) | $m_I(k)$ | $m_Q(k)$ |
| 0 | 0 | 0 | C | S |
| 0 | 0 | 1 | S | C |
| 0 | 1 | 1 | −S | C |
| 0 | 1 | 0 | −C | S |
| 1 | 1 | 0 | −C | −S |
| 1 | 1 | 1 | −S | −C |
| 1 | 0 | 1 | S | −C |
| 1 | 0 | 0 | C | −S |

(Note: C = cos(π/8) and S = sin(π/8) )

From the symbol mapping in FIG. 8, it can be observed that the most significant bit $s_2$ is resilient to errors on the quadrature channel, i.e., a positive modulation symbol value would be interpreted as a "0" with a high degree of certainty whereas a negative modulation symbol value would be interpreted as a "1" with a high degree of certainty. The same would be true for the bit $s_1$ and the in-phase channel. However, the same would not be true for the least significant bit $s_0$. The embodiments described above distributes the protected bits and the unprotected bits uniformly along the packet.

Figure 9:
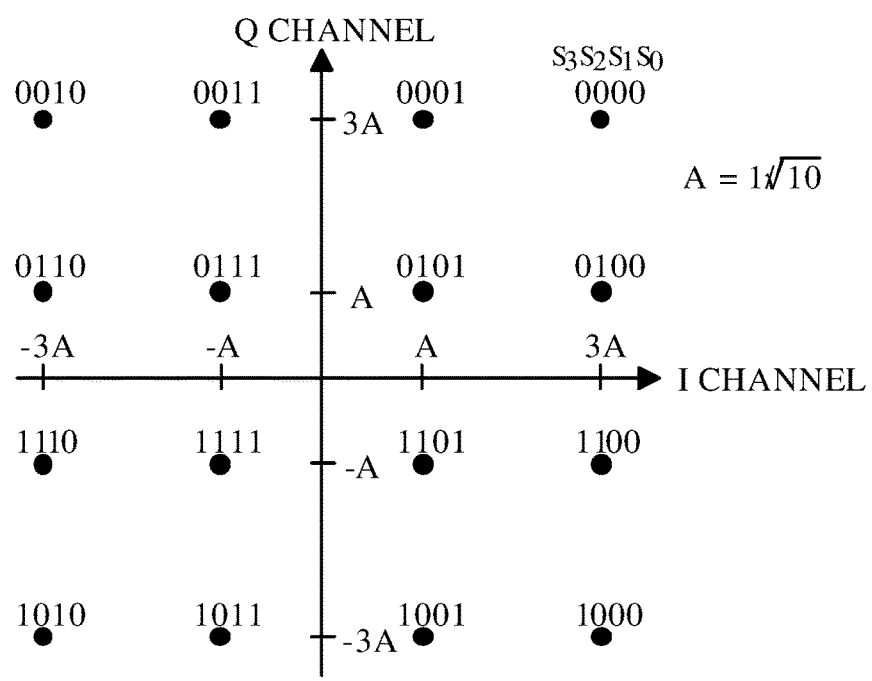
FIG. 9 is a diagram of a signal constellation for the 16-QAM modulation scheme.

In another embodiment, a 16-QAM is used to modulate the signal. FIG. 9 illustrates a signal constellation for the 16-QAM modulation scheme. Four successive channel interleaver output symbols, x(4i), x(4i+1), x(4i+2), and x(4i+3), i=0, . . . , M−1, are mapped to the signal constellation point ($m_1$(i), $m_Q$(i)). Table 5 specifies the mapping of the interleaved symbols to the modulation symbols.

TABLE 5

16-QAM Modulation, where A = 1/√10

| Interleaved Symbols | | | | Modulation Symbols | |
|---|---|---|---|---|---|
| $S_3$ | $s_2$ | $s_1$ | $s_0$ | $M_Q(k)$ | $M_I(k)$ |
| x(4 k + 3) | x(4 k + 2) | x(4 k + 1) | x(4 k) | | |
| 0 | 0 | 0 | 0 | 3A | 3A |
| 0 | 0 | 0 | 1 | 3A | A |

TABLE 5-continued

16-QAM Modulation, where A = 1/√10

| Interleaved Symbols | | | | Modulation Symbols | |
|---|---|---|---|---|---|
| $S_3$ | $s_2$ | $s_1$ | $s_0$ | $M_Q(k)$ | $M_I(k)$ |
| x(4 k + 3) | x(4 k + 2) | x(4 k + 1) | x(4 k) | | |
| 0 | 0 | 1 | 1 | 3A | −A |
| 0 | 0 | 1 | 0 | 3A | −3A |
| 0 | 1 | 0 | 0 | A | 3A |
| 0 | 1 | 0 | 1 | A | A |
| 0 | 1 | 1 | 1 | A | −A |
| 0 | 1 | 1 | 0 | A | −3A |
| 1 | 1 | 0 | 0 | −A | 3A |
| 1 | 1 | 0 | 1 | −A | A |
| 1 | 1 | 1 | 1 | −A | −A |
| 1 | 1 | 1 | 0 | −A | −3A |
| 1 | 0 | 0 | 0 | −3A | 3A |
| 1 | 0 | 0 | 1 | −3A | A |
| 1 | 0 | 1 | 1 | −3A | −A |
| 1 | 0 | 1 | 0 | −3A | −3A |

If the number of required modulation symbols is more than the number provided in the above embodiments, then the complete sequence of input modulation symbols can be repeated as many full-sequence times as possible followed by a partial transmission of a sequence. If a partial transmission is needed, the first portion of the input modulation symbol sequence can be used. Similarly, if the number of required modulation symbols is less than the number provided, only the first portion of the input modulation symbol sequence can be used.

Table 6 provides an example of sequence repetition and puncturing parameters that can be used with the above embodiments. The number of modulation symbols that the modulator can provide per physical layer packet and the number of modulation symbols needed for that data portion of the allocated slots are presented.

TABLE 6

Sequence Repetition and Symbol Puncturing Parameters

| Data Rate (kbps) | # of Slots | # of Bits | # of Mod. Sym. Provided | # of Mod. Sym. Needed | # of Full Sequence Tx | # of Mod. Sym. in Last Partial Tx | Code Rate | Repeat Factor |
|---|---|---|---|---|---|---|---|---|
| 38.4 | 16 | 1024 | 2560 | 24576 | 9 | 1536 | 1/5 | 9.6 |
| 7.8 | 8 | 1024 | 2560 | 12288 | 4 | 2048 | 1/5 | 4.8 |
| 153.6 | 4 | 1024 | 2560 | 6144 | 2 | 1024 | 1/5 | 2.4 |
| 307.2 | 2 | 1024 | 2560 | 3072 | 1 | 512 | 1/5 | 1.2 |
| 614.4 | 1 | 1024 | 1536 | 1536 | 1 | 0 | 1/3 | 1 |
| 307.2 | 4 | 2048 | 3072 | 6272 | 2 | 128 | 1/3 | 2.04 |
| 614.4 | 2 | 2048 | 3072 | 3136 | 1 | 64 | 1/3 | 1.02 |
| 1228.8 | 1 | 2048 | 3072 | 1536 | 0 | 1536 | 2/3 | 1 |
| 921.6 | 2 | 3072 | 3072 | 3136 | 1 | 64 | 1/3 | 1.02 |
| 1843.2 | 1 | 3072 | 3072 | 1536 | 0 | 1536 | 2/3 | 1 |
| 1228.8 | 2 | 4096 | 3072 | 3136 | 1 | 64 | 1/3 | 1.02 |
| 2457.6 | 1 | 4096 | 3072 | 1536 | 0 | 1536 | 2/3 | 1 |

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for wireless communication, the method comprising:
   selecting, by a processor of a mobile station, a base station from a set of base stations in an active set, the active set including a set of base stations currently in communication with the mobile station;
   estimating a preferred data rate at which the mobile station can receive a first data packet from the selected base station;
   transmitting, to the base station, a data rate message that includes a request to send the first data packet at the estimated preferred data rate; and
   receiving a beginning portion of an output sequence from the base station, the output sequence comprising a combination of a block of interleaved data symbols of the first data packet and a block of interleaved parity symbols for the first data packet in which the plurality of interleaved data symbols are located at the beginning portion of the output sequence and the plurality of interleaved parity symbols are located at an end portion of the output sequence.

2. The method of claim 1, further comprising:
   receiving a first segment of the end portion of the output sequence.

3. The method of claim 2, further comprising:
   based at least in part on the first segment of the end portion of the output sequence, determining if the beginning portion of the output sequence is decodable before an arrival of a second segment of the end portion of the output sequence.

4. The method of claim 3, further comprising:
   upon determining the beginning portion of the output sequence is decodable before the arrival of the second segment of the end portion of the output sequence, transmitting an acknowledgment signal to the base station; and
   receiving a beginning portion of a second data packet based on the base station processing the acknowledgement signal.

5. The method of claim 3, further comprising:
   upon determining the beginning portion of the output sequence is not decodable before the arrival of the second segment of the end portion of the output sequence, transmitting a negative acknowledgment signal to the base station; and
   receiving the second segment of the end portion of the output sequence.

6. The method of claim 1, at least one segment of the end portion of the output sequence transmitted by the base station periodically at every fourth slot of a transmission channel.

7. The method of claim 1, further comprising:
   monitoring the pilot signal of each base station maintained in the active set; and
   determining a signal-to-noise-and-interference ratio (SINR) of a pilot signal from each base station in the active set.

8. The method of claim 7, further comprising:
   predicting a future value of the SINR for each base station based on the determined SINR for each base station, the base station selected based on the base station having a favorable future value of SINR among the predicted future values of SINR.

9. The method of claim 1, further comprising:
   identifying a lower bound estimate for an actual SINR of the base station in relation to a duration of the first data packet; and
   determining a maximum data transmission rate that can be sustained by the base station when the actual SINR matches the lower bound estimate.

10. An apparatus for wireless communication comprising:
    a memory; and
    a processor operably connected to the memory, wherein the processor is configured to:
       select a base station from a set of base stations in an active set, the active set including a set of base stations currently in communication with the apparatus;

estimate a preferred data rate at which the apparatus can receive a first data packet from the selected base station;

transmit, to the base station, a data rate message that includes a request to send the first data packet at the estimated preferred data rate; and receive a beginning portion of an output sequence from the base station, the output sequence comprising a combination of a block of interleaved data symbols of the first data packet and a block of interleaved parity symbols for the first data packet in which the plurality of interleaved data symbols are located at the beginning portion of the output sequence and the plurality of interleaved parity symbols are located at an end portion of the output sequence.

11. The apparatus of claim 10, the processor further configured to:

receive a first segment of the end portion of the output sequence.

12. The apparatus of claim 11, the processor further configured to:

based at least in part on the first segment of the end portion of the output sequence, determine if the beginning portion of the output sequence is decodable before an arrival of a second segment of the end portion of the output sequence.

13. The apparatus of claim 12, the processor further configured to:

upon determining the beginning portion of the output sequence is decodable before the arrival of the second segment of the end portion of the output sequence, transmit an acknowledgment signal to the base station; and receive a beginning portion of a second data packet based on the base station processing the acknowledgement signal.

14. The apparatus of claim 12, the processor further configured to:

upon determining the beginning portion of the output sequence is not decodable before the arrival of the second segment of the end portion of the output sequence, transmit a negative acknowledgment signal to the base station; and receive the second segment of the end portion of the output sequence.

15. The apparatus of claim 10, at least one segment of the end portion of the output sequence transmitted by the base station periodically at every fourth slot of a transmission channel.

16. The apparatus of claim 10, the processor further configured to:

monitor the pilot signal of each base station maintained in the active set; and determine a signal-to-noise-and-interference ratio (SINR) of a pilot signal from each base station in the active set.

17. The apparatus of claim 16, the processor further configured to:

predict a future value of the SINR for each base station based on the determined SINR for each base station, the base station selected based on the base station having a most favorable future value of SINR among the predicted future values of SINR.

18. The apparatus of claim 10, the processor further configured to:

identify a lower bound estimate for an actual SINR of the base station in relation to a duration of the first data packet; and determine a maximum data transmission rate that can be sustained by the base station when the actual SINR matches the lower bound estimate.

19. An apparatus for wireless communication comprising:

means for selecting a base station from a set of base stations in an active set, the active set including a set of base stations currently in communication with the apparatus;

means for estimating a preferred data rate at which the apparatus can receive a first data packet from the selected base station;

means for transmitting, to the base station, a data rate message that includes a request to send the first data packet at the estimated preferred data rate; and means for receiving a beginning portion of an output sequence from the base station, the output sequence comprising a combination of a block of interleaved data symbols of the first data packet and a block of interleaved parity symbols for the first data packet in which the plurality of interleaved data symbols are located at the beginning portion of the output sequence and the plurality of interleaved parity symbols are located at an end portion of the output sequence.

20. A non-transitory computer-readable medium programmed with a set of instructions, the instructions executable by a processor to:

select, by a mobile station, a base station from a set of base stations in an active set, the active set including a set of base stations currently in communication with the mobile station;

estimate a preferred data rate at which the mobile station can receive a first data packet from the selected base station;

transmit, to the base station, a data rate message that includes a request to send the first data packet at the estimated data rate; and receive a beginning portion of an output sequence from the base station, the output sequence comprising a combination of a block of interleaved data symbols of the first data packet and a block of interleaved parity symbols for the first data packet in which the plurality of interleaved data symbols are located at the beginning portion of the output sequence and the plurality of interleaved parity symbols are located at an end portion of the output sequence.

* * * * *